United States Patent
Pfenniger

(10) Patent No.: US 7,024,780 B2
(45) Date of Patent: Apr. 11, 2006

(54) METHOD AND DEVICE FOR DETERMINING THE RECTILINEARITY OF GUIDE RAILS

(75) Inventor: Erich Pfenniger, Lucerne (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 10/752,129

(22) Filed: Jan. 6, 2004

(65) Prior Publication Data
US 2004/0154174 A1   Aug. 12, 2004

(30) Foreign Application Priority Data
Jul. 6, 2001   (EP) ................................. 01810669
Jul. 1, 2002   (WO) ..................... PCT/CH02/00355

(51) Int. Cl.
*G01C 15/00*   (2006.01)
(52) U.S. Cl. ................. 33/286; 33/227; 33/DIG. 21; 33/263; 33/533
(58) Field of Classification Search ................. 33/227, 33/263, 286, 613, 645, 533, DIG. 21
See application file for complete search history.

(56) References Cited

U.S. PATENT DOCUMENTS

| | | | | |
|---|---|---|---|---|
| 3,612,700 A | * | 10/1971 | Nelson ................. | 33/DIG. 21 |
| 3,713,746 A | * | 1/1973 | Luthy ........................ | 33/286 |
| 3,750,299 A | * | 8/1973 | Plasser et al. ................ | 33/287 |
| 5,189,799 A | * | 3/1993 | Fairer et al. .................. | 33/281 |
| 5,214,947 A | * | 6/1993 | Sissala et al. ................ | 72/17.3 |
| 5,373,123 A | * | 12/1994 | Skalski ........................ | 73/786 |
| 5,519,944 A | * | 5/1996 | Delastre ....................... | 33/533 |
| 5,617,645 A | | 4/1997 | Wick et al. .................... | 39/551 |
| 5,671,540 A | * | 9/1997 | Davis .......................... | 33/287 |
| 5,798,828 A | * | 8/1998 | Thomas et al. ............... | 33/286 |
| 6,260,285 B1 | * | 7/2001 | Schnetzler et al. ........... | 33/706 |
| 6,497,047 B1 | * | 12/2002 | Miyagawa et al. ........... | 33/533 |
| 6,501,262 B1 | * | 12/2002 | Schneeberger et al. | 33/DIG. 21 |
| 2002/0092193 A1 | * | 7/2002 | DeCecca et al. ............. | 33/613 |

FOREIGN PATENT DOCUMENTS

| | | |
|---|---|---|
| DE | 1 938 901 | 2/1971 |
| DE | 2 043 436 | 3/1972 |
| EP | 0 352 464 | 1/1990 |
| EP | 0 410 542 | 1/1991 |
| EP | 0 498 051 | 8/1992 |
| JP | 63246609 A * | 10/1988 |

* cited by examiner

*Primary Examiner*—Christopher W. Fulton
*Assistant Examiner*—Travis Reis
(74) *Attorney, Agent, or Firm*—Butzel Long

(57) ABSTRACT

A method and a device for determining the rectilinearity of guide rails wherein a guide rail is oriented substantially parallel to a reference axis. At least one light beam is emitted along the reference axis by a light source and is detected by a light detector. When the light source or the light detector is displaced along the guide rail, warping and twisting of the guide rail can be detected as changes in the spacing between the guide rail and the reference axis.

18 Claims, 4 Drawing Sheets

METHOD AND DEVICE FOR DETERMINING THE RECTILINEARITY OF GUIDE RAILS

BACKGROUND OF THE INVENTION

The present invention relates to a method and a device for determining the rectilinearity of guide rails in, for example, an elevator system.

Guide rails serve for the guidance of objects, for example the guidance of elevator cars. Usually several guide rails are connected into a rail strand. Elevator cars are usually conveyed while suspended at cables and are guided by way of guide elements along the rail strand. In that case the rectilinearity of the guide rails is of significance, since the travel comfort depends thereon. Departures from rectilinearity of the guide rails lead to vibrations in the elevator car. Such vibrations make themselves strongly noticeable not only in the case of a long rail strand, but also in the case of fast elevator cars, for example in high buildings, and are regarded by passengers as detrimental.

The patent document EP 0 498 051 shows a method and a device according to which the spacing of a guide rail from a frame is measured by a spacing detector. The frame is in contact with the guide rail by way of two mutually spaced guides and is moved over the guide rail. The spacing detector and frame are connected together. The spacing detector is in contact with the guide rail by way of a roller and measures changes in spacing between the guide rail and the frame. This measuring device is mounted on the elevator car and checks installed guide rails in special test travels. A downstream straightening device corrects specific non-rectilinearities in the guide rail system, for which purpose the respective guide rails are detached from their mounting in the elevator shaft. The high cost connected with the checking and straightening of the guide rails is disadvantageous in this method and this device.

SUMMARY OF THE INVENTION

The present invention relates to a method and a device for determining the rectilinearity of guide rails, wherein a guide rail is oriented substantially parallel to a reference axis. At least one light beam is emitted along the reference axis by a light source. The light beam is detected by a light detector. The light source or the light detector is displaced on a face of the guide rail. The structural dimensions of the guide rail are standardized. A warping of the guide rail is ascertained as a change in the spacing between the guide rail and the reference axis. The method and device according to the present invention allow detection of the dimensional accuracy of the guide rail and, if necessary, a correction or reprocessing of the dimensions of the guide rail before mounting.

It is the object of the present invention to provide a method and a device for determining the rectilinearity of guide rails, the method and device being simple, fast and accurate and compatible with proven techniques and standards of mechanical construction.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
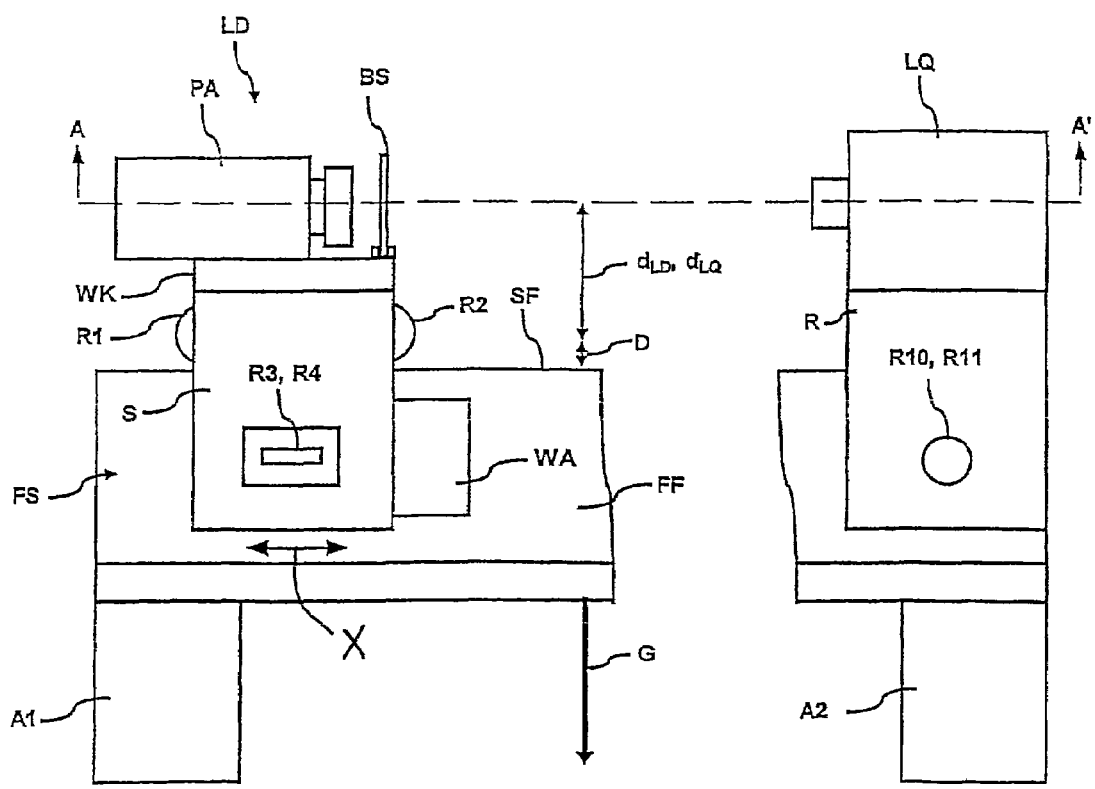
FIG. 1 is a schematic fragmentary side elevation view of a first embodiment of a device for determining the rectilinearity of guide rails according to the present invention.

The device according to the present invention for determining the rectilinearity of guide rails measures individual guide rails FS before mounting, for example before mounting in an elevator shaft. The guide rails are, for example, T-section girders of steel with known standard dimensions. The length of the guide rails FS is known and amounts to, for example, 5000 mm. The height and width of the guide rails FS are similarly known and amount to, for example, 88 mm and 16 mm respectively. The guide rail FS is placed by way of at least one support point on at least one support A1, A2. In the exemplary embodiment of a device for determining the rectilinearity of guide rails in accordance with FIG. 1, the guide rail FS to be measured is placed by way of two support points on the two supports A1, A2, wherein the two support points are near the two opposite ends of the guide rail FS. Advantageously, the guide rail FS lies with a longitudinal axis substantially parallel to a reference axis A–A' on the two supports A1, A2. Between the support points the guide rail FS bends due to its own weight under a gravitational force represented by an arrow G. The reference axis A–A' and the force lines of the gravitational force G are preferably disposed perpendicularly to one another. With advantage, the spacing of the supports A1, A2 relative to one another is known and, for example, fixedly preset and the spacing between the support points and the ends of the guide rail FS is known and, for example, fixedly preset. The spacing of the support points A1, A2 from the ends is advantageously selected so that the bending caused by the gravitational force G is as small as possible. Compensation for the theoretical bending caused by the gravitational force G can be made by means of an evaluating unit AE. The exemplary embodiment of a device for determining the rectilinearity of guide rails in accordance with FIG. 1 is not obligatory for realization of the invention. Thus, it is also possible to place the guide rail FS by way of a single support point on only a single support or by way of more than two support points on more than two supports.

The device for determining the rectilinearity of guide rails comprises a light source LQ that emits at least one light beam. The light beam is preferably sharply focussed and of small diameter. The light source LQ is preferably a laser, for example a laser in the range of visible wavelengths or an infrared laser.

The twisting of a guide rail in the longitudinal direction can be determined with use of two the light beams extending parallel to one another along associated reference axes. The twisting can also be ascertained by one light source and an involved algorithm in that the geometric form and focal point of the light point on a diffusing disc BS is continuously detected or calculated.

In the exemplary embodiment of a device for determining the rectilinearity of guide rails in accordance with FIG. 1 the light source LQ is rigidly mounted at a first end of the guide rail FS. The light source LQ is advantageously mounted on the guide rail FS by way of a slide R, wherein the slide R is pressed against two lateral guide surfaces FF of the guide rail by way of, for example, screws R10, R11. The light beam from the light source LQ is preferably emitted at a constant spacing $d_{LQ}$ from the guide rail FS and along the reference axis A–A'. The spacing $d_{LQ}$ is defined as, for example, the distance between the reference axis A–A' and an upward face SF of the guide rail FS. Other forms of definition are possible. The exemplary embodiment of a device for determining the rectilinearity of guide rails in accordance with FIG. 1 is not obligatory for realization of the invention. Thus it is also possible to mount the light source not on the guide rail, but at a spacing from the guide rail. It is also possible to mount the light source on the guide rail to be movable and/or fixable at freely selectable positions.

Figure 2:
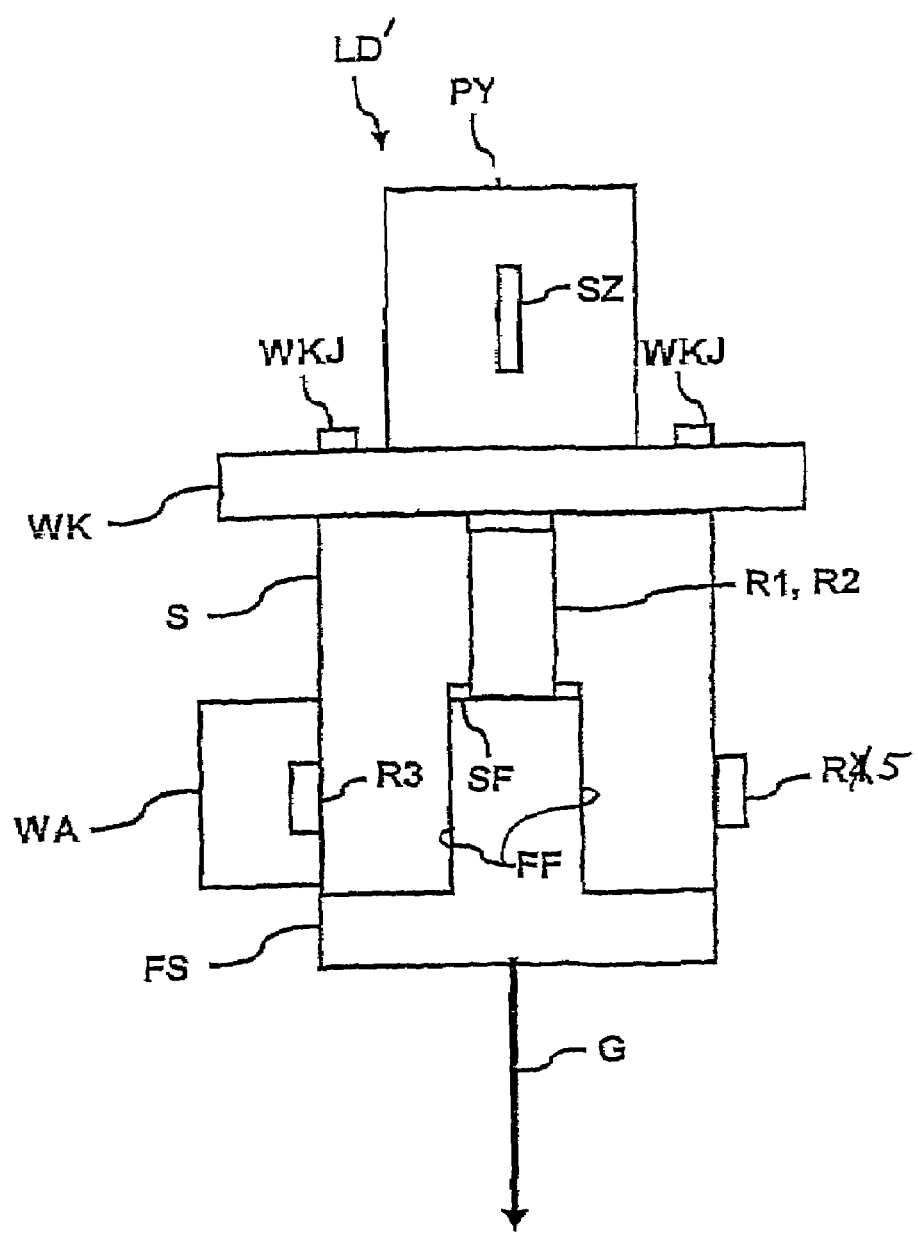
FIG. 2 is a schematic view of a second embodiment of a device for determining the rectilinearity of guide rails according to the present invention.

The device for determining the rectilinearity of guide rails comprises a light detector LD. In the exemplary embodiment of a device for determining the rectilinearity of guide rails in accordance with FIG. 1 the light detector LD is mounted on a carriage S and is movable by way of the carriage S on the guide rail FS between a second end of the guide rail FS and the light source LQ at the first end of the guide rail FS and/or fixable at freely selectable positions. The light detector LD is advantageously mounted on the carriage S so that a spacing $d_{LD}$ between the light detector LD and the guide rail FS is constant for all freely selectable positions on the guide rail FS. The light detector LD enables detection of the light beam emitted by the light source LQ. The spacing $d_{LQ}$ of the light beam, which is emitted by the light source LQ, from the face SF of the guide rail FS and the spacing $d_{LD}$ of a reference point of the light detector LD from the face SF of the guide rail FS are advantageously of the same size, for example the two are disposed in alignment on the reference axis A–A'. The reference point is, for example, a center of the diffusing disc BS or a zero point of a photoarray PY (see FIG. 2). The exemplary embodiment of a device for determining the rectilinearity of guide rails in accordance with FIG. 1 is not obligatory for realization of the invention. Thus, it is also possible to mount the light detector LD not on the guide rail FS, but at a spacing from the guide rail. It is also possible to rigidly mount the light source on the guide rail. In that case it is to be noted that at least one of the two units, either the light source LQ or the light detector LD, is to be mounted on the guide rail to be measured.

Figure 3:
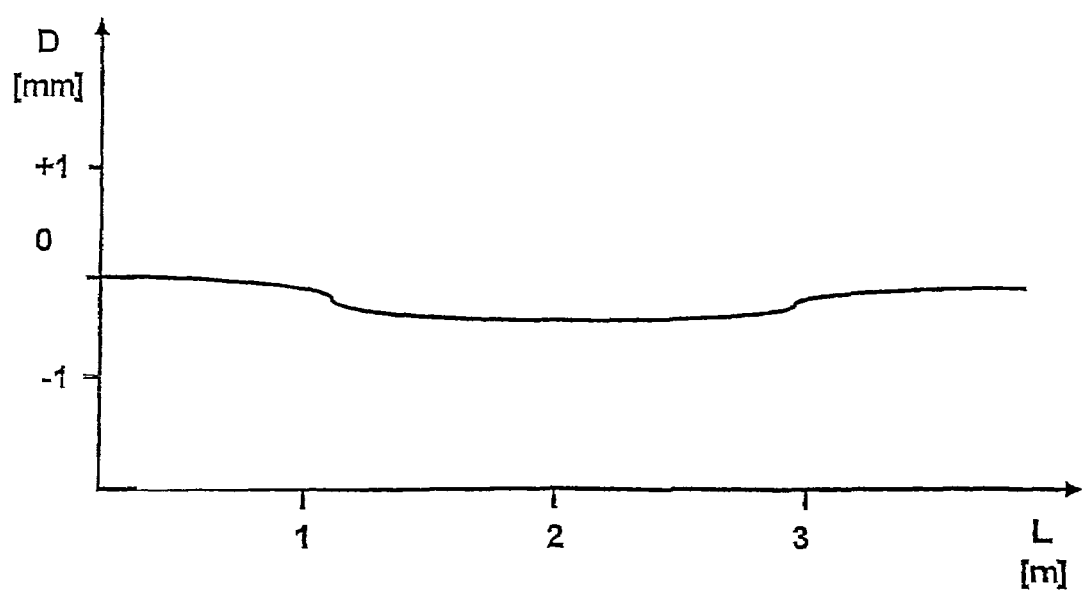
FIG. 3 is a plot of the change in the spacing between the guide rail and the reference axis as sensed by the device and method according to the present invention.
Figure 4:
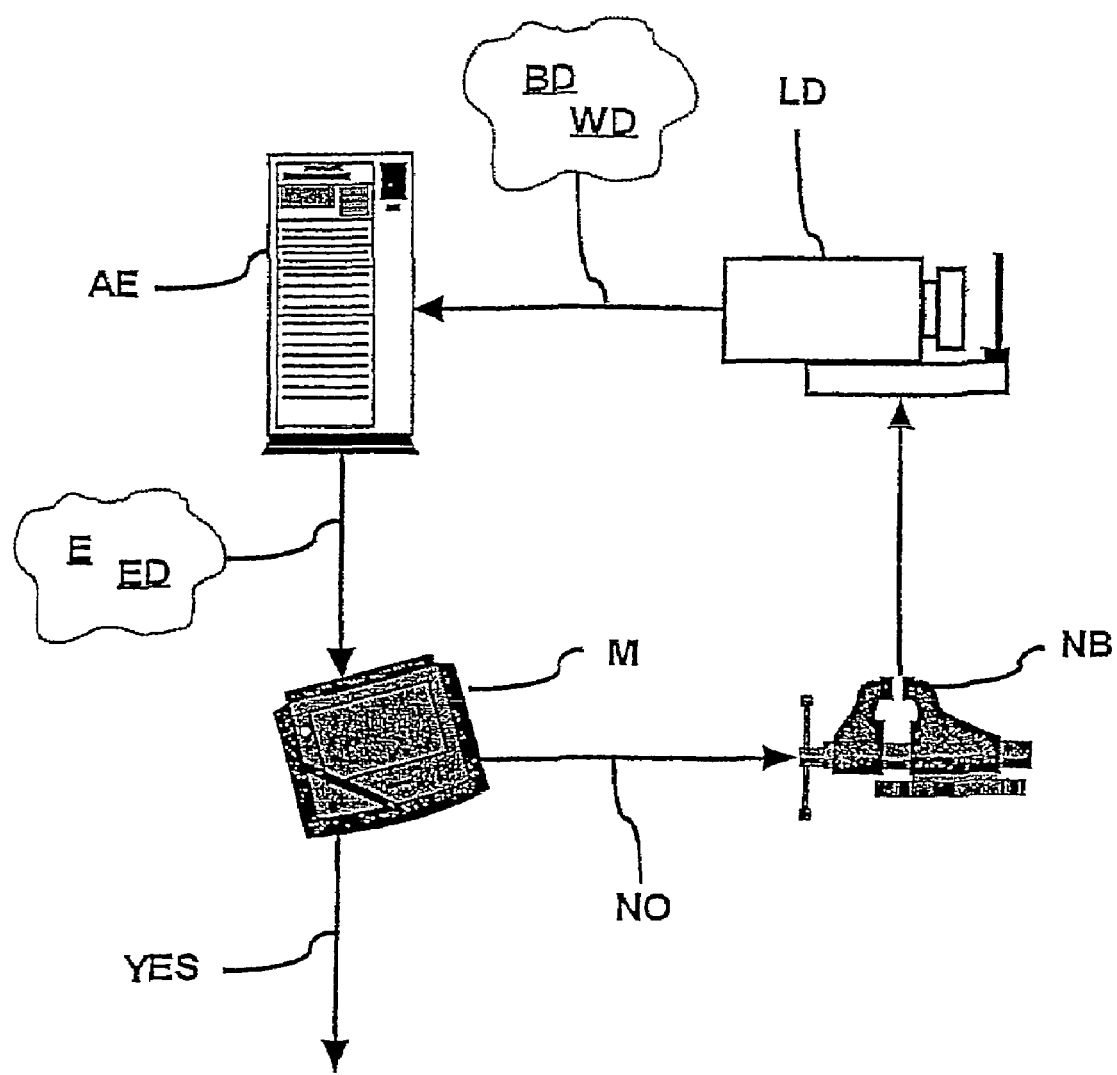
FIG. 4 is a schematic diagram of the detection, transmission and evaluation of image data and travel data by the device and method according to the present invention.

Since the bending of the guide rail FS by virtue of its own weight takes place along the force lines of the gravitational force G, one-dimensional or two-dimensional light detectors LD can be used, wherein the light detectors LD detect changes D (FIG. 3) in the spacing between the guide rail FS and the reference axis A–A'. In the exemplary embodiment of the device for determining the rectilinearity of guide rails in accordance with FIG. 1 the light detector LD consists of the two-dimensional diffusing disc BS with a downstream photo apparatus PA or photo camera as a recording instrument. This enables determination of rectilinearity in horizontal and vertical directions. In the exemplary embodiment of a device for determining the rectilinearity of guide rails in accordance with FIG. 2 a light detector LD' is a one-dimensional photoarray PY with an elongate opening SZ. With advantage, the light detector LD, LD' digitally detects the light beam, which is emitted by the light source LQ, with a resolution of, for example, 1024×1024 image points (the diffusing disc BS and the photo apparatus PA) or 1024 image points (photoarray PY) as image data BD (FIG. 4). Other, for example higher or lower, resolutions are possible. In addition, the expert can use other known light detectors, which are not shown here in detail, of digital or analog form, such as charge-coupled-devices (CCD), photodiodes, etc.

Advantageously, the carriage S has a two-dimensional roller guide which runs in longitudinal direction represented by a double headed arrow X (FIG. 1) on the guide rail FS to be measured. The roller guide comprises at least one roller R1, R2, R3, R4, R5 which keeps the carriage S in contact with the guide rail FS. In the two exemplary embodiments of a device for determining the rectilinearity of guide rails in accordance with FIGS. 1 and 2, the two upper rollers R1, R2 run in a first plane on the face SF of the guide rail FS, while left-hand lateral rollers R3, R4 and the right-hand lateral roller R5 run in a second plane on lateral guide surfaces FF of the guide rail FS. The lateral rollers R3, R4, R5 are advantageously pressed against the guide surfaces FF of the guide rail FS by means of spring force in order to ensure a play-free running of the roller guide or the carriage S in this plane.

With advantage, a length position of the detected change D in the spacing between the guide rail FS and the reference axis A–A' is detected. Each detected warpage is positioned in absolute manner as a spacing from a zero point on the guide rail FS. For this purpose the carriage S advantageously has a travel pick-up WA, wherein the travel pick-up WA measures the spacing, per unit of length and unit of time, of the carriage S in relation to, for example, a zero point, for example the light source LQ at the first end of the guide rail FS or on the second end of the guide rail FS, as travel data WD (FIG. 4).

The travel pick-up is, for example, an encoder. The travel pick-up WA is optional. The detection of the length position of the detected change D in the spacing between the guide rail FS and the reference axis A–A' is also possible, for example, by a ruler. The spacing from a zero point of the guide rail can be read off at the ruler and detected as travel data. The position of the measuring slide can also be calculated through the size of the light point on the diffusing disc BS. Equally, the position can be ascertained by interference of the light source.

The carriage S advantageously comprises an angle member WK, wherein the angle member WK is articulated to the roller guide to be pivotable about at least one axis. In the two exemplary embodiments of a device for determining the rectilinearity of guide rails in accordance with FIGS. 1 and 2, the light detector LD, LD' is mounted in a stationary location on this angle member WK. By way of the angle member WK the angular position of the light detector LD, LD' with respect to the direction of the light beam emitted by the light source LQ is adjustable by an adjusting means WKJ. Any adjusting means, such as car suspensions, frames, screws, etc., are usable. An optical filter is optionally fixable to the slide between the light source LQ and the light detector LD, LD'.

Advantageously, the light source LQ and the light detector LD, LD' are arranged in alignment along the reference axis A–A' of the direction of the light beam emitted by the light source LQ. In the exemplary embodiment of a device for determining the rectilinearity of guide rails in accordance with FIG. 1, the light beam emitted by the light source LQ is incident in advantageous manner at an angle of less than 90° on the photo apparatus PA or the photo camera in order to avoid reflective effects onto the optical system of the photo apparatus PA or the photo camera. The angle of incidence of the light beam, which is emitted by the light source LQ, on the photo apparatus PA or the photo camera is advantageously settable by way of the pivotable angle member WK.

The manner of recordal of the image data BD or the travel data WD takes place continuously or discontinuously.

In the case of continuous detection of the image data BD or the travel data WD the carriage S is in an advantageous manner guided along the guide rail FS at a constant speed, for example by means of a drive (not shown), while the image data BD from the light detector LD, LD' or the travel data WD from the travel pick-up WA are detected per freely selectable unit of length and unit of time. It is obviously also possible to stop the carriage S for the data detection and then to guide it to a further position on the guide rail FS. The data detection takes place at, for example, uniform or non-uniform length sections or time intervals. For example, the image data BD are detected every 10 cm, preferably every 2 cm, for preference every 5 mm.

In the case of a discontinuous detection of the image data BD or the travel data WD the carriage S is in advantageous manner guided to specific freely selectable positions of the guide rail FS in order to detect the image data BD from the light detector LD, LD'. A travel pick-up is usable, but not necessary, for such a discontinuous operation. For example, instead of a travel pick-up it is possible to place a ruler against the guide rail FS and to detect, in accordance with this ruler, the image data BD from the light detector LD, LD' at spacings of, for example, 50 cm, preferably 5 cm, for preference 5 mm. The warping of the guide rail FS can thus be detected in incremental steps and digitized as absolute positions over the length of the guide rail FS. Non-rectilinearities of the guide rail FS can thus be localized very precisely as length positions. Many possibilities of variation in the form of recordal of the image data BD or the travel data WD are freely available to the expert with knowledge of the present invention.

FIG. 4 shows a schematic diagram of the detection, transmission and evaluation of the image data BD or the travel data WD. The image data BD ascertained by the light detector LD (or LD') are passed on to the evaluating unit AE and the travel data WD ascertained by the travel pick-up are passed on to the evaluating unit AE. This transmission can be carried out in numerous modes and manners, for example by signal cable, or cordlessly, or by transport of the image data BD or the travel data WD stored on a storage medium, etc. The evaluating unit AE is advantageously a commercially available computer with a central computing unit, at least one memory and communication interfaces, etc.

The change D in the spacing between the guide rail FS and the reference axis A–A' is computed in a locally resolved manner in the evaluating unit AE starting from these image data BD or travel data WD. Standard software can be used for that purpose. A result E of this calculation can be further processed as result data ED, for example stored, or graphically represented. FIG. 3 shows a resulting exemplary diagram of the change D (vertical axis) in the spacing between the guide rail FS and the reference axis A–A' in local resolution over a length L (horizontal axis) of the guide rail FS. For example, the change D for the length L of 5 m amounts to around 0.5 mm. In addition, the permissible deviation in rectilinearity is filed in the evaluating unit AE, which enables an automatic selection of guide rails with respect to rectilinearity.

It is provided in that case to preset a maximum permissible warping or a freely settable permissible warping. The change D in the spacing between the reference axis A–A' and the guide rail FS can be computed as permissible (YES) or impermissible (NO) for each point of the guide rail FS on the basis of such a permissible warping. The obtained relative deviations are made available to the engineer who thereby gains information about local non-rectilinearities of the guide rail FS and in which direction and by which amount the guide rail FS has to be straightened so that the guide rail FS corresponds with the selected permissible warping. With advantage the guide rail FS is straightened only when the result E exceeds the permissible warping. It is thus achieved that on the one hand the guide rail FS only has to be reprocessed as accurately as necessary and costly reprocessing time is saved and on the other hand no vibrations, which impair travel comfort, are transmitted from the guide rail FS to the elevator car.

Local non-rectilinearities of the guide rail FS are straightened by the engineer, for example in accordance with a correction protocol in a reprocessing unit NB on the basis of the result E with result data ED. The result data allow accurate diagrams as well as concrete straightening proposals, so that the engineer can reprocess the guide rail FS precisely and quickly. This reprocessing can in turn be checked by the device for determining the rectilinearity. It is also possible to indicate the correction or the result of the correction "on line", i.e. in real time, for example on a monitor M. In the embodiment according to FIG. 4 the monitor M is part of a portable computer, for example a hand-held computer, which obtains the result data ED, for example, by way of signal cable, or, for example, cordlessly by radio. In principle it is possible to realize the evaluating unit AE and the monitor M in a portable computer, for example in a hand-held computer. Overall, the quality of the straightening operation is significantly increased.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of determining whether a guide rail has a rectilinearity suitable for use in an elevator installation for moving persons or goods, comprising the steps of:
   a. prior to use in an elevator installation, orienting an elevator guide rail with a longitudinal axis substantially parallel to a reference axis;
   b. emitting at least one light beam along the reference axis from a light source;
   c. providing a light detector for detecting the light beam;
   d. displacing at least one of the light source and the light detector along an elevator car travel face of the elevator guide rail and detecting a spacing between the guide rail travel face and the reference axis at a zero position on the elevator guide rail and at a plurality of spaced apart length positions on the elevator guide rail;
   e. determining whether there is a change in the detected spacing at any of the spaced apart length positions from the detected spacing at the zero position; and
   f. upon determining that there is at least one change in the detected spacings, calculating on the basis of a permissible deviation in rectilinearity whether each change in the spacings is permissible or impermissible whereby the elevator guide rail can be used in an elevator installation if all the changes are permissible.

2. The method according to claim 1 wherein said step a. is performed by orienting the longitudinal axis of the elevator guide rail generally horizontal with the travel face facing upwardly.

3. The method according to claim 1 wherein said step b. is performed by emitting the light beam from the light source at a constant spacing from the travel face of the elevator guide rail.

4. The method according to claim 1 wherein said step d. is performed by detecting a spacing in a horizontal direction and in a vertical direction at each length position.

5. The method according to claim 1 wherein said step c. is performed by detecting the light beam as image data per unit of length and unit of time.

6. The method according to claim 1 wherein said step d, includes detecting a length position on the elevator guide rail at each of the length positions as travel data.

7. The method according to claim 1 including detecting a geometric form of the light beam for each of the length positions, ascertaining a focal point of each of the geometric forms and determining a twisting of the elevator guide rail from a change in the focal points.

8. The method according to claim 1 wherein said steps a. through d. are performed with two light beams each emitted along an associated reference axis and including determining a twisting of the elevator guide rail from a change in two detected spacings at each of the length positions.

9. The method according to claim 1 including providing an evaluating unit, generating travel data representing the length positions, transmitting image data from the light detector and the travel data to the evaluating unit, operating the evaluating unit to perform said steps e. and f. and identify any local non-rectilinearity of the elevator guide rail.

10. The method according to claim 1 including straightening any local non-rectilinearity of the elevator guide rail identified by the evaluating unit in a reprocessing unit.

11. In combination an elevator guide rail and device for determining the rectilinearity of said guide rail to be used in an elevator installation for moving persons or goods, comprising:
    at least one support for supporting the elevator guide rail with a longitudinal axis substantially parallel to a reference axis;
    a light source emitting at least one light beam and being mounted on a travel face of an elevator guide rail to emit said at least one light beam along the reference axis;
    a light detector for detecting said at least one light beam and generating a detector signal, said light detector being mounted on the travel face of the elevator guide rail and at least one of said light source and said light detector being movable along the elevator guide rail; and
    an evaluating unit connected to said light detector for receiving said detector signal, where the elevator guide rail is mounted on said at least one support and said light source and said light detector are mounted on the travel face of the elevator guide rail, said evaluating unit calculates from said detector signal any changes in spacing between the travel face of the guide rail and the reference axis as at least one of said light source and said light detector are moved along the elevator guide rail and indicates on the basis of a permissible deviation in rectilinearity whether the changes in the spacing are permissible or impermissible.

12. The device according to claim 11 wherein said light source is adapted to be rigidly mounted on the guide rail and said light detector adapted to be movably mounted on the guide rail.

13. The device according to claim 11 wherein said light detector includes a diffusing disc and a downstream photo apparatus for generating said image data.

14. The device according to claim 11 wherein said light detector includes a photoarray for generating said image data.

15. The device according to claim 11 including a travel pick-up movable with said at least one of said light source and said light detector being movable along the guide rail for generating travel data representing the length positions, said travel pick-up being connected to said evaluating unit for transmitting said travel data to said evaluating unit.

16. The device according to claim 11 including a carriage for engaging the travel face and having an angle member, said light detector being connected to said angle member for angular movement relative to a direction of the travel face.

17. The device according to claim 11 including a monitor connected to said evaluating unit for visually displaying straightening proposals for reprocessing the elevator guide rail.

18. A method of determining whether a guide rail is suitable for use in an elevator installation for moving persons or goods, comprising the steps of:
    a. processing a guide rail for use in an elevator installation;
    b. prior to use, orienting the guide rail with a longitudinal axis substantially parallel to a reference axis;
    c. emitting at least one light beam along the reference axis from a light source;
    d. providing a light detector for detecting the light beam;
    e. displacing at least one of the light source and the light detector along a travel face of the guide rail and detecting a spacing between the guide rail travel face and the reference axis at a zero position on the guide rail and at a plurality of spaced apart length positions on the guide rail;
    f. determining whether there is a change in the detected spacing at any of the spaced apart length positions from the detected spacing at the zero position;
    g. upon determining that there is at least one change in the detected spacings, calculating on the basis of a permissible deviation in rectilinearity whether each change in the spacings is permissible or impermissible whereby the elevator guide rail can be used in an elevator installation if all the changes are permissible; and
    h. if at least one of the changes in the spacings is impermissible, reprocessing the guide rail and repeating said steps b. trough g.

* * * * *